United States Patent [19]

Kranz et al.

[11] 4,104,276
[45] Aug. 1, 1978

[54] CONVERSION OF CRUDE COPPER PHTHALOCYANINES TO A PIGMENTARY FORM

[75] Inventors: Joachim Kranz, Ludwigshafen; Werner Jettmar, Mannheim; Rudolf Polster, Frankenthal, all of Fed. Rep. of Germany

[73] Assignee: BASF Aktiengesellschaft, Ludwigshafen am Rhein, Fed. Rep. of Germany

[21] Appl. No.: 740,009

[22] Filed: Nov. 8, 1976

[30] Foreign Application Priority Data

Dec. 3, 1975 [DE] Fed. Rep. of Germany ....... 2554252

[51] Int. Cl.$^2$ ............................................ C09B 47/04
[52] U.S. Cl. .................................. 260/314.5; 8/1 XA; 106/288 Q; 106/308 N; 106/309; 260/242.2; 260/270 P; 260/299
[58] Field of Search ................. 260/314.5, 270 P, 299, 260/242.2; 106/288 Q, 308 N, 309; 8/1 XA

[56] References Cited

U.S. PATENT DOCUMENTS

| 2,857,400 | 10/1958 | Cooper ......................... 260/314.5 X |
| 3,119,835 | 1/1964 | Schmidt ........................ 260/314.5 |
| 3,201,051 | 8/1965 | Manger et al. ............... 260/314.5 X |
| 3,523,030 | 8/1970 | Malin et al. .................... 260/314.5 X |

Primary Examiner—Richard L. Raymond
Attorney, Agent, or Firm—Keil, Thompson & Shurtleff

[57] ABSTRACT

A process for converting crude copper phthalocyanine to a pigmentary form, wherein finely divided and heavily agglomerated crude copper phthalocyanine which exhibits disturbed crystallization and which has a primary particle size of less than 0.1 μm is introduced into an organic or aqueous organic medium together with from 0.5 to 7% by weight, based on the crude copper phthalocyanine, of a basic copper phthalocyanine of the formula

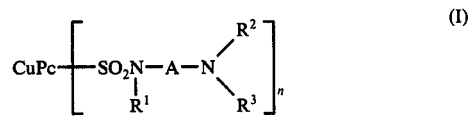

or

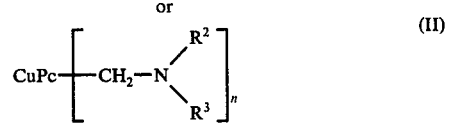

or of mixtures thereof (where CuPc is an n-valent copper phthalocyanine radical, $R^1$ is H or alkyl of 1 to 4 carbon atoms, A is linear or branched alkylene, $R^2$ is alkyl of 1 to 20 carbon atoms, alkoxyalkyl of 3 to 12 carbon atoms or cycloalkyl of 6 to 8 carbon atoms, $R^3$ is H, alkyl of 1 to 4 carbon atoms or cycloalkyl of 6 to 8 carbon atoms or

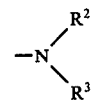

is a saturated heterocyclic 5-membered, 6-membered or 7-membered ring, and n is an integer from 1 to 6), and the suspension is heated at from room temperature to 180° C until the pigment exhibits optimum tinctorial strength. Pigments of high tinctorial strength, which give colorations having a pure hue, are obtained.

10 Claims, No Drawings

CONVERSION OF CRUDE COPPER PHTHALOCYANINES TO A PIGMENTARY FORM

The present invention relates to a process for converting crude copper phthalocyanines to a pigmentary form which gives deep colorations.

Since crude pigments, as obtained from their processes of synthesis, are not usually in a form (in respect of crystal form and particle size) in which they exhibit optimum tinctorial properties, especially optimum tinctorial strength, they must be converted to suitable pigmentary forms. This conversion into a suitable form for tinctorial purposes is referred to as finishing.

One of the principal problems in finishing crude pigments is to select, and maintain, conditions such that the product obtained substantially exhibits the particle size which corresponds to optimum tinctorial properties. The effect of exceeding, or going below, a certain crystal size is the same, namely to give a pigment which does not possess optimum tinctorial properties.

The finishing of the crude pigment can be effected by impurities or by-products contained therein, or by additives which may be added before or during finishing, if these materials are built into the crystal, or deposited on the surface of the crystal, during the recrystallization which occurs in the finishing process.

When finishing finely disperse crude copper phthalocyanines in organic media or aqueous organic media, there is a tendency for "overcrystallization" of the pigment particles, i.e. the conditions favor the lengthwise growth of the crystals so that in many cases acicular or rod-shaped crystals result. Such pigments exhibit only mediocre tinctorial properties.

The effect of "overcrystallization", or "over-finishing", is in particular encountered if, in order to achieve particular pigmentary properties, the finely disperse crude pigment has been treated with sulfuric acid, for example to convert it to the α-modification.

We have found that the disadvantages of overcrystallization, when converting copper phthalocyanines to a pigmentary form by treating finely divided and heavily agglomerated copper phthalocyanines which exhibit disturbed crystallization and have a primary particle size of less than 0.1 μm, and which are obtained by ball-milling crude copper phthalocyanines in the presence or, preferably, in the absence, of milling assistants, the treatment being carried out in an organic or aqueous organic medium, can be virtually completely avoided when the milled material is introduced into the organic or aqueous medium together with form 0.5 to 7 percent by weight, based on the crude copper phthalocyanine, of one or more basic copper phthalocyanines of the formula

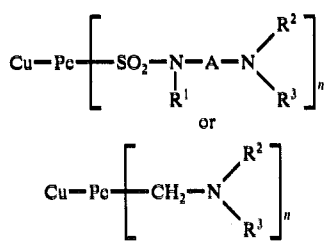

where CuPc is an n-valent copper phthalocyanine radical, $R^1$ is hydrogen or alkyl of 1 to 4 carbon atoms. A is saturated, linear or branched alkylene of 2 to 6 carbon atoms, the N atoms being on different carbon atoms of the alkylene, $R^2$ is alkyl of 1 to 20 carbon atoms, alkoxyalkyl of a total of 3 to 12 carbon atoms or cycloalkyl of 6 to 8 carbon atoms, $R^3$ is hydrogen, alkyl of 1 to 4 carbon atoms or cycloalkyl of 6 to 8 carbon atoms or the group

is a saturated heterocyclic 5-membered, 6-membered or 7-membered ring which may or may not contain an additional oxygen, sulfur or nitrogen atom as a ring member, or the group

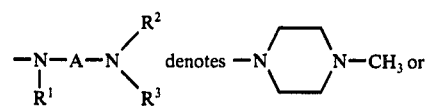

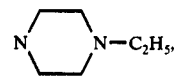

and $n$ is from 1 to 6, and the mixture is kept at from room temperature to 180° C for recrystallization of the particles, after which the pigment is isolated by conventional methods.

The process according to the invention gives copper phthalocyanine pigments which have a high tinctorial strength and exhibit good particle size distribution.

The starting material is finely divided copper phthalocyanine, which is obtained by milling crude copper phthalocyanine in a ball mill in the presence or, preferably, in the absence of milling assistants, such as salts, e.g. sodium chloride, sodium sulfate, calcium chloride and the like. Suitable crude copper phthalocyanines are virtually halogen-free copper phthalocyanines, copper phthalocyanines having a chlorine content of up to 5 percent by weight, corresponding to monochloro-copper phthalocyanine. Crude copper phthalocyanine which is in the β-modification is in part converted, during ball milling, to the α-modification, i.e. the milled material is a mixture of copper phthalocyanine in the β-modification and in the α-modification. The milled material is heavily agglomerated because of the crystals disintegrated during milling and the high surface charges resulting therefrom. The agglomerates, which may be up to 150 μm in size, consist of particles, referred to as primary particles, which are smaller than 0.1 μm. The preferred mean primary particle size is from 0.05 to 0.01 μm. The material can be additionally characterized as follows: The BET surface area is from 3 to 8 m²/g; the wetting volume (propanol) is from 0.5 to 1 cm³/g; and 50 percent of the milled material consists of particles of size 10 μm or larger. By comparison, finished copper phthalocyanines have BET surface areas of 30 to 90, preferably 50 to 85, cm²/g, the wetting volume being 1.5 to 5 cm³/g. This finely divided milled material is advantageously obtained by milling crude copper phthalocyanine in a ball mill, without milling assistants, for from 15 to 40 hours.

Another suitable starting material is crude copper phthalocyanine which is obtained by swelling the finely divided crude copper phthalocyanine (milled material) described above in sulfuric acid of from 60 to 80 percent strength by weight. The finely divided crude pigment thus obtained is entirely in the α-modification. From this material it is possible to produce, for example, copper phthalocyanine pigments having certain specific properties.

Suitable basic copper phthalocyanines which act as growth regulators in the process of the invention are those of the formulae

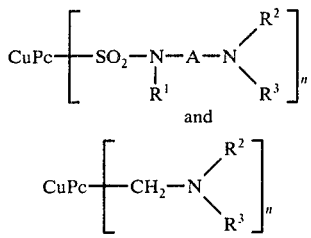

or mixtures thereof. In these formulae, the symbols have the following meanings: $R^1$ is alkyl of 1 to 4 carbon atoms, e.g. methyl, ethyl, propyl, butyl or, preferably, hydrogen, $R^2$ is alkyl of 1 to 20 carbon atoms or alkoxyalkyl of 3 to 12 carbon atoms or cycloalkyl of 6 to 8 carbon atoms, e.g. methyl, ethyl, propyl, isopropyl, butyl, isobutyl, sec.-butyl, pentyl, isopentyl, hexyl, isohexyl, octyl, 2-ethylhexyl, nonyl, decyl, isodecyl, dodecyl, stearyl, palmityl, oleyl, 2-methoxyethyl, 2-ethoxyethyl, 2-butoxyethyl, 3-ethoxypropyl, 3-methoxypropyl, 3-butoxypropyl, 3-(2'-ethylhexoxy)-propyl, cyclohexyl, methylcyclohexyl or dimethylcyclohexyl, $R^3$ is hydrogen or alkyl of 1 to 4 carbon atoms, e.g. the alkyl radicals of 1 to 4 carbon atoms listed for $R^1$, cyclohexyl or methylcyclohexyl and A is saturated, linear or branched alkylene of 2 to 6 carbon atoms, e.g. 1,2- and 1,3-butylene, 1,6-hexylene, or, preferably, 1,2-ethylene, 1,2-propylene and 1,3-propylene.

The group

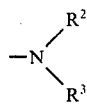

may also be a saturated, 5-membered, 6-membered or 7-membered heterocyclic ring which may contain —O—,

or —S— as a further ring member, $R^4$ being hydrogen or, preferably, methyl or ethyl. Specific examples are the N-piperidyl, N-morpholinyl, N'-methyl-N-piperazinyl, N'-ethyl-N-piperazinyl, N-thiomorpholinyl and N-hexamethyleneimine (—N(CH$_2$)$_6$) radical.

$n$ is a number from 1 to 6, preferably from 2 to 4.

For technical and commercial reasons, preferred basic copper phthalocyanines of the formulae I and II are those where $R^1$ is hydrogen, $R^2$ is methyl, ethyl, propyl, butyl, cyclohexyl or methylcyclohexyl, and $R^3$ is hydrogen, methyl, ethyl, propyl, butyl, cyclohexyl, or

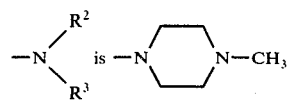

and A is —CH$_2$CH$_2$,

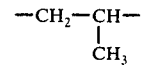

or —CH$_2$—CH$_2$—CH$_2$—. $n$ is preferably a number from 2 to 4.

The amount of basic copper phthalocyanines is from 0.5 to 7, preferably from 1 to 5, percent by weight, based on the finely divided crude copper phthalocyanine (i.e. the milled material).

The basic copper phthalocyanines used as growth regulators are conventional materials or can be prepared in accordance with conventional methods, e.g. by reacting copper phthalocyanine-monosulfonyl chlorides to -hexasulfonyl chlorides with the diamines of the formula

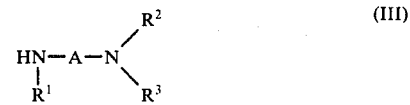

or by reacting mono- to hexa-chloromethyl-copper phthalocyanine with amines of the formula

Yet a further possible method is to alkylate copper phthalocyanines containing —CH$_2$—NH$_2$ groups.

Examples of basic copper phthalocyanines of the formula II suitable for the process according to the invention are reaction products of chloromethyl-copper phthalocyanines which possess from one to 6, preferably from 2 to 4, chloromethyl groups, or of their mixtures, with dimethylamine, diethylamine, dipropylamine, dibutylamine, methylamine, ethylamine, propylamine, butylamine, amylamine, hexylamine, octylamine, 2-ethylhexylamine, decylamine, dodecylamine, stearylamine, palmitylamine, 3-(2'-ethylhexoxy)-propylamine, 3-methoxypropylamine, 3-ethoxypropylamine, 3-propoxypropylamine, 3-butoxypropylamine, 2-methoxyethylamine, 2-ethoxyethylamine, 2-butoxyethylamine, cyclohexylamine, N,N-bis-cyclohexylamine, N-methylcyclohexylamine, piperidine, morpholine, N'-methylpiperazine, N'-ethylpiperazine, thiomorpholine, hexamethyleneimine (HN(CH$_2$)$_6$)

or mixtures of these amines.

Suitable basic copper phthalocyanines of the formula I are reaction products of mixtures of mono- to hexasulfonyl chlorides of copper phthalocyanine, preferably reaction products of copper phthalocyaninesulfonyl chloride mixtures which on average contain from 2 to 4 sulfonyl chloride groups, with diamines of the formula (III). Specific examples of amine components are: 2-dimethylamino-ethylamine, 2-diethylamino-ethylamine, 2-dipropylamino-ethylamine, 2-dibutylaminoethylamine, 3-dimethylaminopropylamine, 3-diethylaminopropylamine, 3-dibutylamino-propylamine, 2-cyclohexylamino-ethylamine, 3-cyclohexylamino-propylamine, 3-(methyl-cyclohexylamino)-propylamine, 2-stearylamino-ethylamine, 3-stearylamino-propylamine, N'-methylpiperazine and 4-diethylamino-1-methylbutyl-1-amine.

In general, the process of the invention is carried out by introducing the milled material, in the presence of the said basic copper phthalocyanines, into the organic or aqueous organic phase. The basic copper phthalocyanine can be added to the liquid beforehand or be introduced into the liquid together with the milled material. Preferably, a mixture of the milled material and the basic copper phthalocyanine, obtained by milling basic copper phthalocyanine with crude copper phthalocyanine, is introduced into the liquid. The basic copper phthalocyanine can be added to the copper phthalocyanine from the start, or only at the end, of the milling process. The decisive factor is that the basic copper phthalocyanine used as the growth regulator should be present from the start of the finishing process.

Suitable organic liquids or organic constituents of the aqueous organic phase, in which the finishing of the milled crude pigment to give the final pigmentary form is carried out, are aliphatic ketones of 3 to 10 carbon atoms, saturated cyclic ethers of 4 to 10, preferably of 4 to 6, carbon atoms, aliphatic alcohols of 1 to 8 carbon atoms, benzenehydrocarbons, saturated cycloaliphatic hydrocarbons of 6 to 8 carbon atoms or aliphatic chlorohydrocarbons of 1 to 4 carbon atoms.

Specific examples of ketones of 3 to 10 carbon atoms are acetone, methyl ethyl ketone (= butan-2-one), diethyl ketone, methyl propyl ketone, methyl isopropyl ketone, methyl butyl ketone, methyl isobutyl ketone or their mixtures.

Examples of suitable cyclic saturated ethers are tetrahydrofuran, dioxane, tetrahydropyran or mixtures of these.

Amongst the group of the aliphatic alcohols of 1 to 8 carbon atoms, examples which may be mentioned are methanol, ethanol, n-propanol, isopropanol, n-butanol, isobutanol, sec.-butanol, amyl alcohol, isoamyl alcohol, n-hexanol, isohexanol, heptanol, isoheptanol, octanol, isooctanol, 2-ethylhexanol or mixtures of these.

Examples of suitable benzenehydrocarbons, cycloaliphatic hydrocarbons or aliphatic chlorohydrocarbons are benzene, toluene, xylene, mesitylene, ethylbenzene, cyclohexane, methylcyclohexane, dimethylcyclohexane, methylcyclopentane, chloroform, methylene chloride, carbon tetrachloride, 1,2-dichloroethane, trichloroethane, tetrachloroethane, trichloroethylene, propyl chloride, butyl chloride, dichloropropane, dichlorobutane or mixtures of these.

For economic and tinctorial reasons, the organic liquid used is preferably methyl ethyl ketone, diethyl ketone, tetrahydrofuran, dioxane, isobutanol, benzene, toluene, xylene, cyclohexane, methylcyclohexane, methylene chloride, chloroform, carbon tetrachloride, 1,2-dichloroethane, dichloropropane, trichloroethylene or tetrachloroethane or mixtures of these liquids.

The amount of organic liquid used is not critical and can therefore be varied within a wide range provided the mixture can be stirred before, during and after the finishing process. In general, from 2 to 20, preferably from 2.5 to 10, times the amount, by weight, of the milled material is used.

If mixtures of water and an organic liquid are used for the finishing process, the ratio of water to the organic liquid can be varied within a wide range. As a rule, mixtures in which this ratio is from 1:100 to 6:1, preferably from 1:2 to 4:1, parts by weight, are used.

The ratio of the milled material to the liquid phase is in general the same as when carrying out the finishing process in a purely organic phase.

The finishing of the milled material is carried out at from room temperature to 180° C, preferably from 20° to 130° C.

Where the finishing is carried out in an aqueous organic phase, the process is preferably conducted at the boiling point of the mixture, under atmospheric pressure. The finishing can also be carried out under pressure, in which case it may be carried out at temperatures above the boiling point of the organic liquid used or above the boiling point of the azeotrope of water and the organic liquid.

The duration of the finishing treatment depends on the temperature and on the organic liquid used and is in general from 0.2 to 10 hours. The mixture is preferably kept at the desired temperature until the pigment has optimum tinctorial properties, e.g. optimum color strength. After completing the finishing process, the finished mixture is worked up by conventional methods and the pigment is isolated.

Advantageously, the organic liquid is removed as an azeotrope or by dilution with water. The pigment is isolated from the aqueous phase, e.g. by filtering, decanting or centrifuging. The filter residue is washed if necessary and can then be dried or be processed further whilst moist.

The azeotropic distillate can be re-used for the finishing process, after topping-up with the missing or depleted constituents.

Compared to copper phthalocyanine pigments which have been finished under otherwise identical conditions, but in the absence of basic copper phthalocyanines, the products of the process of the invention exhibit a significantly higher tinctorial strength and a somewhat purer hue.

The Examples which follow illustrate the invention. Parts and percentages are by weight. CuPc = copper phthalocyanine.

The finely divided crude copper phthalocyanine obtained, in the Examples, by milling in ball mills consists of agglomerates, of up to 150 μm in size, which in turn consist of primary particles having a mean size of from 0.01 to 0.05 μm. The BET surface area is from 3 to 5 m$^2$/g, and 50% of the agglomerates have a size of 10 μm or larger.

EXAMPLE 1

100 Parts of a mixture of 98 parts of a crude copper phthalocyanine prepared from phthalodinitrile and copper-I chloride by the solvent process, and 2 parts of a mixture of CuPc—[CH$_2$NHC$_2$H$_5$]$_n$ and CuPc—[CH$_2$—N(C$_2$H$_5$)$_2$]$_n$, where $\bar{n}$ = 3.7, which have been milled for 30 hours in a ball mill, without milling assistants (mean primary particle size 0.02 μm; BET surface area 4 m$^2$/g; size of the agglomerates up to 150 μm; 50% of the agglomerates have a size of 10 μm or above), are introduced into a mixture of 240 parts of butan-2-one and 200 parts of water, and the batch is kept at the boil for 5 hours. The butanone is then distilled off as an azeotrope with water and the pigment is obtained by filtering off the aqueous phase.

After drying, 99.8 parts of a phthalocyanine pigment in the β-modification, having a specific surface area, determined by the BET nitrogen adsorption method (BET = process described by St. Brunauer, P. H. Emmet and E. Teller, J. Amer. Chem. Soc. 60, (1938), 309) of 68.1 m²/g, are obtained. The pigment has a substantially greater tinctorial strength, and gives colorations of a purer hue, than a pigment which has been finished in the absence of the basic copper phthalocyanine but under otherwise identical conditions (comparative product). The latter has a surface area of 53.1 m²/g determined by the BET method.

Furthermore, the pigment obtained in accordance with the invention gives substantially more transparent films when used in nitrocellulose gravure printing than does the comparative pigment.

EXAMPLES 2 to 4

The procedure described in Example 1 is followed, but a crude copper phthalocyanine which has been produced from phthalic anhydride, urea and copper-I chloride by the solvent process is used. The milled material has the same properties as that obtained in Example 1.

Before milling, the amounts shown in the Table of a mixture of $CuPc-[CH_2NHC_2H_5]_n$ and $CuPc-[CH_2-N(C_2H_5)_2]_n$, where $\bar{n} \approx 3.8$, are added to the crude copper phthalocyanine.

The properties of the pigments obtained are summarized in the Table:

| Ex. | Amount of basic CuPc added[+] % | Specific surface area by the BET method m²g | Pigment Tinctorial strength[++] | Hue[++] |
|---|---|---|---|---|
| 2 | 1 | 59.9 | ≈3% stronger | Very slightly purer |
| 3 | 2 | 69.7 | 16% stronger | Somewhat purer |
| 4 | 3 | 77.0 | 22% stronger | Substantially purer |
| Comparative product | 0 | 58.8 | Comparative product | Comparative product |

[+] based on CuPc
[++] relative to comparative product

EXAMPLES 5 to 7

100 Parts, at a time, of a crude copper phthalocyanine obtained from o-phthalodinitrile and copper-I chloride by the solvent process are milled for 30 hours in a ball mill with the amounts, shown in the Table, of a mixture of $CuPc-[CH_2-NHC_2H_5]_n$ and $CuPc-[CH_2-N(C_2H_5)_2]_n$ where $n = 3$ and 4. The milled material consists of agglomerates of up to 150 μm in size made up of primary particles of 0.1 μ, mean size. The BET surface area is 4 m²/g. 55% of the agglomerates are of size 10 μm or above. The milled material, in a mixture of 400 parts of tetrahydrofuran and 300 parts of 10 per cent strength sodium chloride solution, is then heated at the boil for 5 hours. Thereafter the tetrahydrofruan is distilled off, the aqueous suspension is filtered and the filter residue is dried. In each case 100 parts of pigment are obtained; the pigments have the properties shown in the Table.

For comparison, the same crude copper phthalocyanine is finished in the absence of basic copper phthalocyanine derivatives.

| Example | Amount of basic CuPc added[+] % | Specific surface area by the BET method m²/g | Pigment Tinctorial strength[++] | Hue[++] |
|---|---|---|---|---|
| 5 | 1 | 54.7 | 3% stronger | Somewhat purer |
| 6 | 2 | 61.5 | 7% stronger | " |
| 7 | 3 | 63.8 | 9% stronger | " |
| Comparative product | 0 | 48.7 | Comparative product | Comparative product |

[+] based on CuPc
[++] relative to comparative product

EXAMPLE 8

100 Parts of a crude copper phthalocyanine manufactured from o-phthalodinitrile and copper-I chloride by the solvent process are milled for 30 hours in a ball mill in the absence of milling assistants. The milled material consists of agglomerates of up to 150 μm in size, made up of primary particles of 0.2 μm mean size. The BET surface area is 5 m²/g. 50% of the agglomerates are of size 10 μm or above. 2.5 parts of a mixture of $CuPc-[CH_2-NHC_2H_5]_n$ and $CuPc-[CH_2-N(C_2H_5)]_n$, where $n = 3$ and 4, are added to the milled material and the mixture is homogenized. Thereafter the mixture of introduced into 600 parts of 63 per cent strength sulfuric acid. The whole is stirred for two hours at room temperature and then poured out onto ice/water and the suspension is filtered. The filter residue, which consists entirely of the α-modification, is then mixed with 100 parts of isobutanol and the water content is brought to a total of 400 parts by adding water. The suspension is heated for 5 hours under reflux, the isobutanol is then distilled off as an azeotrope, and the pigment is isolated from the aqueous suspension.

100 Parts of a copper phthalocyanine pigment in the α-modification, which has a specific surface area of 67.3 m²/g and a tinctorial strength 9% greater than that of a pigment which has been finished in the same manner but in the absence of basic copper phthalocyanine compounds, are obtained. The comparative pigment has a specific surface area, measured by the BET method, of 58.0 m²/g. The tinctorial strength of the pigment according to the invention is about 16% greater than that of a copper phthalocyanine pigment which is obtained by milling in the presence of a 10-fold amount of sodium chloride.

EXAMPLE 9

The procedure followed is as described in Example 8 except that 3 parts of a mixture of

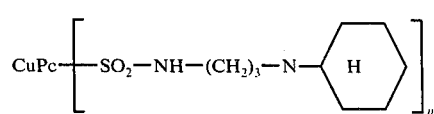

where $n = 2, 3$ and 4, are used as the basic copper phthalocyanine derivative.

100 Parts of a pigment which has a BET surface area of 71.0 m²/g and a tinctorial strength about 6% greater than that of a comparative pigment which has been finished without basic copper phthalocyanine are obtained.

EXAMPLE 10

The procedure followed is as described in Example 8, but a milled material obtained by milling 97.5 parts of crude copper phthalocyanine and 2.5 parts of the basic copper phthalocyanine derivative mentioned in Example 8 is used.

The copper phthalocyanine pigment obtained has virtually the same tinctorial strength as that obtained according to Example 8, but gives colorations of a purer hue (α-modification). The specific surface area measured by the BET method is 71.7 m²/g.

EXAMPLE 11

97.5 Parts of crude copper phthalocyanine, in the form of the crude product obtained by the baking process from phthalodinitrile and copper-I chloride in the presence of sodium sulfate and/or sodium chloride (i.e. in the form of a crude product containing 50% of salt) are milled for 30 hours in a ball mill with 2.5 parts of a mixture of CuPc—[CH$_2$—NH—CH$_3$]$_n$ and CuPc—[CH$_2$—N(CH$_3$)]$_n$, where $\bar{n} = 3.5$. The milled product is introduced into water so as to remove the salt. The suspension is filtered and the filter residue is washed. The salt-free material corresponds to that of Example 8.

The filter residue is then stirred with 160 parts of tetrahydrofuran and 100 parts of 10 percent strength sodium hydroxide solution for 5 hours under reflux. Thereafter the tetrahydrofuran is distilled off, the pigment is isolated from the aqueous suspension and the filter residue is washed neutral with water.

100 Parts of a pigment having a BET surface area of 83.6 m²/g are obtained. The pigment has a redder hue than the comparative pigment which is obtained in the same manner, but in the absence of basic copper phthalocyanine compounds (specific surface area, measured by the BET method, 75.5 m²/g).

EXAMPLE 12

150 Parts of the crude copper phthalocyanine mentioned in Example 11 are milled for 30 hours in a ball mill. The milled material corresponds to that of Example 8. 3 parts of a mixture of CuPc—[CH$_2$—N-H—C$_2$H$_5$]$_n$ and CuPc—[CH$_2$—N(C$_2$H$_5$)$_2$]$_n$, where $n = 2$, 3 and 4, are added to the milled material and the homogeneous mixture is introduced into 500 parts of 69 percent strength sulfuric acid. This mixture is stirred for 6 hours at 35° C and is then introduced into water. The resulting suspension is filtered and the residue is washed several times with water. Thereafter the filter residue, which consists of pure α-CuPc, is mixed, whilst moist, with 80 parts of tetrahydrofuran and 40 parts of 25 percent strength sodium hydroxide solution and the suspension is heated for 6 hours under reflux. The tetrahydrofuran is then distilled off and the pigment is obtained from the aqueous suspension by filtration and is washed neutral with water.

100 Parts of pigment having a specific surface area, measured by the BET method, of 88.5 m²/g, and possessing a tinctorial strength 12% greater than that of a comparative pigment which has been finished in the absence of basic copper phthalocyanines but under otherwise identical conditions (surface area measured by the BET method: 70.6 m²/g), are obtained.

EXAMPLE 13

The procedure followed is as described in Example 12, but the basic copper phthalocyanine derivative used consists of 3 parts of a mixture of

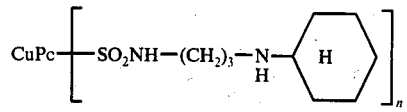

where $n = 3$ and 4 ($\bar{n} \approx 3.5$).

The resulting copper phthalocyanine pigment has a specific surface area, measured by the BET method, of 84.8 m²/g and its tinctorial strength is about 8% greater than that of the comparative pigment.

EXAMPLE 14

The procedure followed is as described in Example 12, but the milled material used is a crude copper phthalocyanine which has been obtained by milling 148 parts of crude copper phthalocyanine and 2 parts of a mixture of CuPc—[CH$_2$NHC$_2$H$_5$]$_n$ and CuPc—[CH$_2$—N(C$_2$H$_5$)$_2$]$_n$, where $n = 3$ and 4 ($\bar{n} \approx 3.8$). The milled material has much the same properties as that of Example 5.

About 150 parts of a copper phthalocyanine pigment having a specific surface area of 83.1 m²/g are obtained.

The tinctorial strength of the pigment is about 10% greater than that of a pigment which has been finished in the absence of basic copper phthalocyanine compounds but under otherwise identical conditions.

EXAMPLE 15

(a) A mixture of 100 parts of the crude copper phthalocyanine mentioned in Example 11, 200 parts of a chlorine-free crude copper phthalocyanine which has been produced from o-phthalodinitrile and copper-I chloride by the solvent process, and 7.5 parts of a mixture of CuPc—[CH$_2$N(C$_2$H$_5$)$_2$]$_n$, where $\bar{n} = 3.4$ is milled for 20 hours in a ball mill. The milled material consists of agglomerates of up to 150 μm in size, made up of primary particles of 0.2 μm mean size. The BET surface area is 5 m²/g. 50% of the agglomerates are of size 10 μm or above. The milled material is introduced into a 20-fold amount of water and is stirred hot until the salt has dissolved. The warm suspension is filtered. The moist filter cake is introduced into 400 parts of tetrahydrofuran and 200 parts of 6 percent strength sodium hydroxide solution and the mixture is stirred for 5 hours at the reflux temperature. The tetrahydrofuran is then distilled off and the pigment is filtered off and washed. 300 Parts of a copper phthalocyanine pigment which is very suitable for coloring surface coatings are obtained. Specific surface area, measured by the BET method: 74 m²/g. The tinctorial strength is 6% greater than that of the comparative pigment obtained according to (b).

The same result is achieved if the two crude copper phthalocyanines are milled separately and the basic copper phthalocyanine is added to the milled material, i.e. one or both components.

(b) Comparative pigment: 100 parts of the crude copper phthalocyanine mentioned in Example 11 and 200 parts of a chlorine-free copper phthalocyanine (produced from o-phthalodinitrile and copper-I chloride by the solvent process) are milled for 20 hours in a ball mill. The milled material is then introduced into water, as described under (a), in order to remove the salt, and thereafter the filter residue is finished in tetrahydrofuran/water. 300 parts of a pigment, predominantly in the β-modification, suitable for use in surface coatings are obtained. The surface area was found to be 65 m²/g when determined by the BET method.

EXAMPLE 16

A mixture of 93 parts of crude copper phthalocyanine and 7 parts of a mixture of $CuPc-[CH_2-N(C_2H_5)_2]_n$, where $n = 3$ and 4, is milled for 28 hours in a ball mill. The milled material corresponds to that of Example 8.

8 Parts of the milled material are stirred into 29 parts of a 35% strength solution of a binder for printing inks, in toluene, and the whole is dispersed for 30 minutes. For comparison, a printing ink was produced from the same crude copper phthalocyanine, which had however been milled in the absence of the basic copper phthalocyanine.

The printing inks have the following properties:

|  | Surface area by the BET method m²/g | Tinctorial strength relative to product | Purity of hue comparative | Gloss |
|---|---|---|---|---|
| with basic CuPc | 39.2 | +10% | purer | 15 |
| without additive comparative product) | 22.1 | comparative product | comparative product | 7 |

EXAMPLES 17 to 21

The procedure described in Example 1 is followed, but instead of the basic copper phthalocyanines mentioned there, X parts of the copper phthalocyanine compounds mentioned in the Table are used. The pigments obtained have the same good properties as the pigment obtained according to Example 1.

tuted for the basic copper phthalocyanines used in Examples 3, 4, 6, 7, 8, 9, 10, 11 or 12.

EXAMPLE 22

(a) 100 Parts of copper phthalocyanine (produced from o-phthalodinitrile and copper-I chloride by the solvent process) and 2 parts of a mixture of $CuPc-[CH_2-NH-C_2H_5]_n$ and $CuPc-[CH_2-N(C_2H_5)_2]_n$, where $\bar{n} = 3.6$, are milled for 30 hours in a ball mill, without milling assistants. The milled material consists of agglomerates of up to 150 μm in size, made up of primary particles of 0.1 μm mean size. The BET surface area is 4 m²/g. 55% of the agglomerates are of size 10 μm or above.

The milled material is introduced into a mixture of 240 parts of cyclohexane and 200 parts of water and the batch is stirred for 5 hours under reflux. The cyclohexane is then distilled off and the finished pigment is isolated from the aqueous suspension by filtration.

The pigment has a surface area, measured by the BET method, of 65–66 m²/g, and its tinctorial strength is 7% greater than that of the comparative pigment which has been finished in the absence of basic copper phthalocyanine but under otherwise identical conditions (BET surface area 64 m²/g).

The pigment obtained according to the invention furthermore exhibits a somewhat purer hue than the comparative pigment.

EXAMPLE 23

The procedure described in Example 22 is followed, but the finishing is carried out in the presence of 500 parts of cyclohexane (i.e. in the absence of water); 100.5 parts of a pigment having a BET surface area of 74.4 m²/g are obtained.

The pigment has a tinctorial strength which is about 5% greater, and gives somewhat purer colorations than the comparative pigment which has been finished in the absence of basic copper phthalocyanine (BET surface area 69.3 m²/g).

| Example | Basic copper phthalocyanine | | X (parts) |
|---|---|---|---|
| 17 | $CuPc-[CO_2NH-(CH_2)_3-NH-\langle C_6H_{10}-CH_3 \rangle]_n$ | n = 3 and 4 | 3 |
| 18 | $CuPc-[CH_2-NH-(CH_2)_3-N(CH_3)_2]_n$ | n = 3 and 4 | 2 |
| 19 | $CuPc-[SO_2-NH-CH(CH_3)-(CH_2)_3-N(C_2H_5)_2]_n$ | n = 3 and 4 | 3 |
| 20 | $CuPc-[SO_2-N(piperazine)N-CH_3]_n$ | n = 3 and 4 | 2 |
| 21 | $CuPc-[SO_2-NH-(CH_2)_3-NH-C_{18}H_{37}]_n$ | n = 3 and 4 | 5 |

The same result is obtained if the basic copper phthalocyanines mentioned in Examples 17 to 21 are substi-

EXAMPLE 24

The milled material described in Example 22 is used. The finishing is carried out in 240 parts of chloroform and 200 parts of water under reflux. Duration: two hours. Working up takes place as described in Example 22.

The yield is 101 parts of a pigment having a BET surface area of 46.7 m²/g. The tinctorial strength of the pigment is about 5% greater than that of a pigment finished in the absence of basic copper phthalocyanine but under otherwise identical conditions.

EXAMPLE 25

The procedure described in Example 23 is followed, but 500 parts of chloroform are used for the finishing process. After heating for 2 hours under reflux, water is added, the chloroform is distilled off and the pigment is isolated from the aqueous suspension.

101 Parts of pigment having a BET surface area of 75.3 m²/g are obtained. This pigment has a tinctorial strength which is about 5% greater than that of a copper phthalocyanine finished in the absence of basic copper phthalocyanines, under otherwise identical conditions, and its hue is somewhat purer.

We claim:

1. In a process for converting crude copper phthalocyanines to a pigmentary form by treating finely divided and heavily agglomerated copper phthalocyanines which exhibit disturbed crystallization and have a primary particle size of less than 0.1 μm, and which are obtained by ball-milling crude copper phthalocyanines while suspending the milled material in an organic or aqueous organic phase, the improvement wherein the finely divided milled material is introduced into the organic or aqueous organic medium together with from 0.5 to 7 percent by weight, based on the crude copper phthalocyanine, of one or more basic copper phthalocyanines of the formula

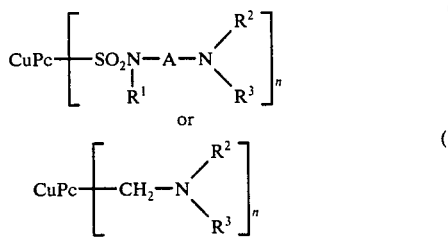

where CuPc is an n-valent copper phthalocyanine radical, $R^1$ is hydrogen or alkyl of 1 to 4 carbon atoms, A is saturated, linear or branched alkylene of 2 to 6 carbon atoms, the N atoms being on different carbon atoms, $R^2$ is alkyl of 1 to 20 carbon atoms or alkoxyalkyl of 3 to 12 carbon atoms or cycloalkyl of 6 to 8 carbon atoms, $R^3$ is hydrogen, alkyl of 1 to 4 carbon atoms or cycloalkyl of 6 to 8 carbon atoms, or the group

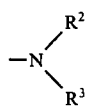

is a saturated heterocyclic 5-membered, 6-membered or 7-membered ring which may in addition contain an oxygen atom, sulfur atom or a further nitrogen atom as a ring member, or

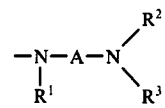

denotes

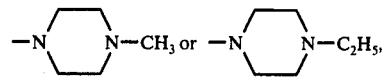

and n is a number from 1 to 6, and the mixture is kept at from room temperature to 180° C for recrystallization, after which the pigment is isolated.

2. A process as claimed in claim 1, wherein from 1 to 5% by weight, based on the copper phthalocyanine, of basic copper phthalocyanine is used.

3. A process as claimed in claim 1, wherein compounds of the formulae

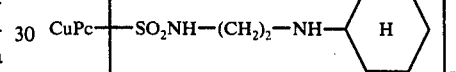 where m = 2, 3 or 4

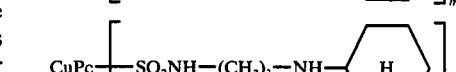 where m = 2, 3 or 4

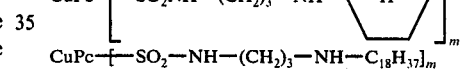 where m = 2, 3 or 4

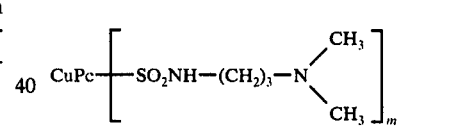 where m = 2, 3 or 4 where m = 2, 3 or 4 where m = 2, 3 or 4

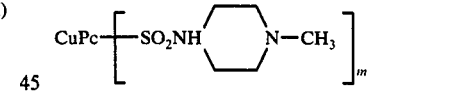 where m = 2, 3 or 4 or mixtures thereof are used as basic copper phthalocyanines.

4. A process as claimed in claim 1, wherein aliphatic ketones of 3 to 10 carbon atoms, saturated cyclic ethers of 4 to 6 carbon atoms, aliphatic alcohols of 1 to 8 carbon atoms, benzenehydrocarbons, saturated cycloaliphatic hydrocarbons of 6 to 8 carbon atoms or aliphatic chlorohydrocarbons of 1 to 4 carbon atoms are used as the organic medium or as the organic constituent of the aqueous organic medium.

5. A process as claimed in claim 2, wherein aliphatic ketones of 3 to 10 carbon atoms, saturated cyclic ethers of 4 to 6 carbon atoms, aliphatic alcohols of 1 to 8 carbon atoms, benzenehydrocarbons, saturated cycloaliphatic hydrocarbons of 6 to 8 carbon atoms or aliphatic chlorohydrocarbons of 1 to 4 carbon atoms are used as the organic medium or as the organic constituent of the aqueous organic medium.

6. A process as claimed in claim 2, wherein acetone, methyl ethyl ketone, diethyl ketone, methyl propyl ketone, methyl isopropyl ketone, methyl butyl ketone, methyl isobutyl ketone, tetrahydrofuran, dioxane, tetrahydropyran, methanol, ethanol, n-propanol, isopropanol, n-butanol, isobutanol, sec.-butanol, amyl alcohol, isoamyl alcohol, n-hexanol, isohexanol, heptanol, isoheptanol, octanol, isooctanol, 2-ethylhexanol, benzene, toluene, xylene, mesitylene, ethylbenzene, cyclohexane, methylcyclohexane, dimethylcyclohexane, methylcyclopentane, chloroform, methylene chloride, carbon tetrachloride, 1,2-dichloroethane, trichloroethane, tetrachloroethane, trichloroethylene, propyl chloride, butyl chloride, dichloropropane, dichlorobutane or mixtures thereof are used as the organic medium or as the organic constituent of the aqueous organic medium.

7. A process as claimed in claim 2, wherein methyl ethyl ketone, diethyl ketone, tetrahydrofuran, dioxane, isobutanol, benzene, toluene, xylene, cyclohexane, methylcyclohexane, methylene chloride, chloroform, carbon tetrachloride, 1,2-dichloroethane, dichloropropane, trichloroethylene, tetrachloroethane or mixtures thereof are used as the organic medium or as the organic constituent of the aqueous organic medium.

8. A process as claimed in claim 2, wherein the mixture is kept at from 20° to 130° C.

9. A process as claimed in claim 1, wherein the amount of organic or aqueous organic medium used is from 2 to 20 times the amount by weight of the crude pigment.

10. A process as claimed in claim 1, wherein the ratio of water to the organic constituent in the aqueous organic medium is from 1:100 to 6:1.

* * * * *